US012706264B2

(12) United States Patent
Zhang

(10) Patent No.: US 12,706,264 B2
(45) Date of Patent: Aug. 11, 2026

(54) MOVABLE CONTACT MODULE, MOVABLE CONTACT ASSEMBLY, MOVABLE CONTACT DEVICE AND CONTACTOR

(71) Applicant: Tyco Electronics (Shanghai) Co., Ltd., Shanghai (CN)

(72) Inventor: Xiaoning Zhang, Shenzhen (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 498 days.

(21) Appl. No.: 18/355,716

(22) Filed: Jul. 20, 2023

(65) Prior Publication Data

US 2024/0029984 A1 Jan. 25, 2024

(30) Foreign Application Priority Data

Jul. 20, 2022 (CN) ........................ 202210858080.9

(51) Int. Cl.
*H01H 50/54* (2006.01)
*H01H 50/64* (2006.01)

(52) U.S. Cl.
CPC ............ *H01H 50/54* (2013.01); *H01H 50/64* (2013.01)

(58) Field of Classification Search
CPC ...... H01H 50/54; H01H 50/64; H01H 50/026; H01H 50/546; H01H 50/44; H01H 50/541; H01H 50/58
See application file for complete search history.

(56) References Cited

U.S. PATENT DOCUMENTS

| | | | |
|---|---|---|---|
| 4,604,597 A | 8/1986 | Bogner et al. | |
| 2020/0294747 A1 | 9/2020 | Yao et al. | |

FOREIGN PATENT DOCUMENTS

| | | | |
|---|---|---|---|
| CN | 211125513 U * | 7/2020 | |
| JP | S59035335 A | 2/1984 | |
| JP | 2021018957 A | 2/2021 | |
| KR | 20230003027 A * | 1/2023 | ............... H01H 9/30 |
| KR | 20230160954 A * | 11/2023 | ............ H01H 50/64 |

OTHER PUBLICATIONS

Japanese Office Action dated Apr. 1, 2025 with English translation, corresponding to Application No. 2023-116463, 18 pages.

* cited by examiner

*Primary Examiner* — Mohamad A Musleh
(74) *Attorney, Agent, or Firm* — Barley Snyder

(57) ABSTRACT

A movable contact module for a contactor comprises an insulating member and a movable contact. The insulating member includes an insulating body having a through hole penetrating therethrough, and a peripheral wall protruding from the insulating body and surrounding an opening of the through hole. The movable contact has a fixed portion fixed in the insulating body, and an exposed portion exposed from the insulating body. The fixed portion of the movable contact is surrounded by the insulating body so that the movable contact is electrically isolated from a drive shaft passing through the through hole. The peripheral wall of the insulating member increases a creepage distance between the drive shaft passing through the through hole and the exposed portion of the movable contact.

20 Claims, 8 Drawing Sheets

MOVABLE CONTACT MODULE, MOVABLE CONTACT ASSEMBLY, MOVABLE CONTACT DEVICE AND CONTACTOR

CROSS-REFERENCE TO RELATED APPLICATIONS

This application claims the benefit of Chinese Patent Application No. CN202210858080.9 filed on Jul. 20, 2022, in the State Intellectual Property Office of China, the whole disclosure of which is incorporated herein by reference.

FIELD OF THE INVENTION

The present invention relates to a movable contact module of a contactor, a movable contact assembly of a contactor comprising the movable contact module, a movable contact device of a contactor including the contactor movable contact assembly, and a contactor including the contactor movable contact device.

BACKGROUND

A contactor typically includes a housing, a movable contact, a static contact, a drive shaft, a coil, a magnetic core, and a magnetic conductive component. The static contact, coil, and magnetic conductive component are fixedly arranged in the housing. The movable contact, drive shaft, and magnetic core are movably arranged in the housing. When the coil is energized, it generates a magnetic field, which produces electromagnetic force on the drive shaft and magnetic core. Under the action of the electromagnetic force, the drive shaft drives the movable contact to move to a closed position in contact with the static contact. When the coil is deenergized, the magnetic field and electromagnetic force cease, and the drive shaft drives the movable contact to an opened position separated from the static contact under the action of the return spring.

In applications without insulation isolation requirements, the drive shaft is usually directly connected to the movable contact. For applications with insulation isolation requirements, safety standards require that the coil circuit and contact circuit meet certain insulation distance requirements. However, in existing applications, the creepage distance between the movable contact and the drive shaft (i.e., the shortest distance along a surface of a solid insulating material between the movable contact and the drive shaft) is relatively short, which does not meet the requirements for high-voltage isolation.

In addition, in the prior art, in order to detect the state of the main contact, it is necessary to provide an auxiliary switch and an auxiliary switch pressing portion. The auxiliary switch pressing portion is usually connected to the drive shaft and moves synchronously therewith. When the drive shaft drives the movable contact to the closed position, the auxiliary switch pressing portion presses the auxiliary switch to trigger the auxiliary switch. When the drive shaft drives the movable contact to the opened position, the auxiliary switch pressing portion is separated from the auxiliary switch to release the auxiliary switch and restore the auxiliary switch to its initial state. Therefore, the position of the movable contact can be determined based on the state of the auxiliary switch. That is, when the auxiliary switch is in the triggered state, it is determined that the movable contact is in the closed position. When the auxiliary switch is in the initial state, it is determined that the movable contact is still in the opened position. However, due to the elastic connection between the movable contact and the drive shaft, the drive shaft can move an overtravel amount relative to the movable contact. Therefore, when the movable and static contacts cannot be separated from each other due to fusion or other fault conditions, the drive shaft can still be moved by an overstroke or overtravel distance under the action of the spring. This may cause the auxiliary switch pressing portion to release the auxiliary switch, resulting in the auxiliary switch returning to its initial state. Therefore, in prior art devices, there is uncertainty in determining whether the movable contact has fusion or other faults based on the state of the auxiliary switch, which affects the safety of use.

SUMMARY

According to an embodiment of the present disclosure, a movable contact module for a contactor comprises an insulating member and a movable contact. The insulating member includes an insulating body having a through hole, and a peripheral wall protruding from the insulating body and surrounding an opening of the through hole. The movable contact has a fixed portion fixed in the insulating body, and an exposed portion exposed from the insulating body. The fixed portion of the movable contact is surrounded by the insulating body so that the movable contact is electrically isolated from a drive shaft passing through the through hole. The peripheral wall of the insulating member increases the creepage distance between the drive shaft passing through the through hole and the exposed portion of the movable contact.

BRIEF DESCRIPTION OF THE DRAWINGS

The invention will now be described by way of example with reference to the accompanying Figures, of which.

DETAILED DESCRIPTION OF THE EMBODIMENTS

Figure 1:
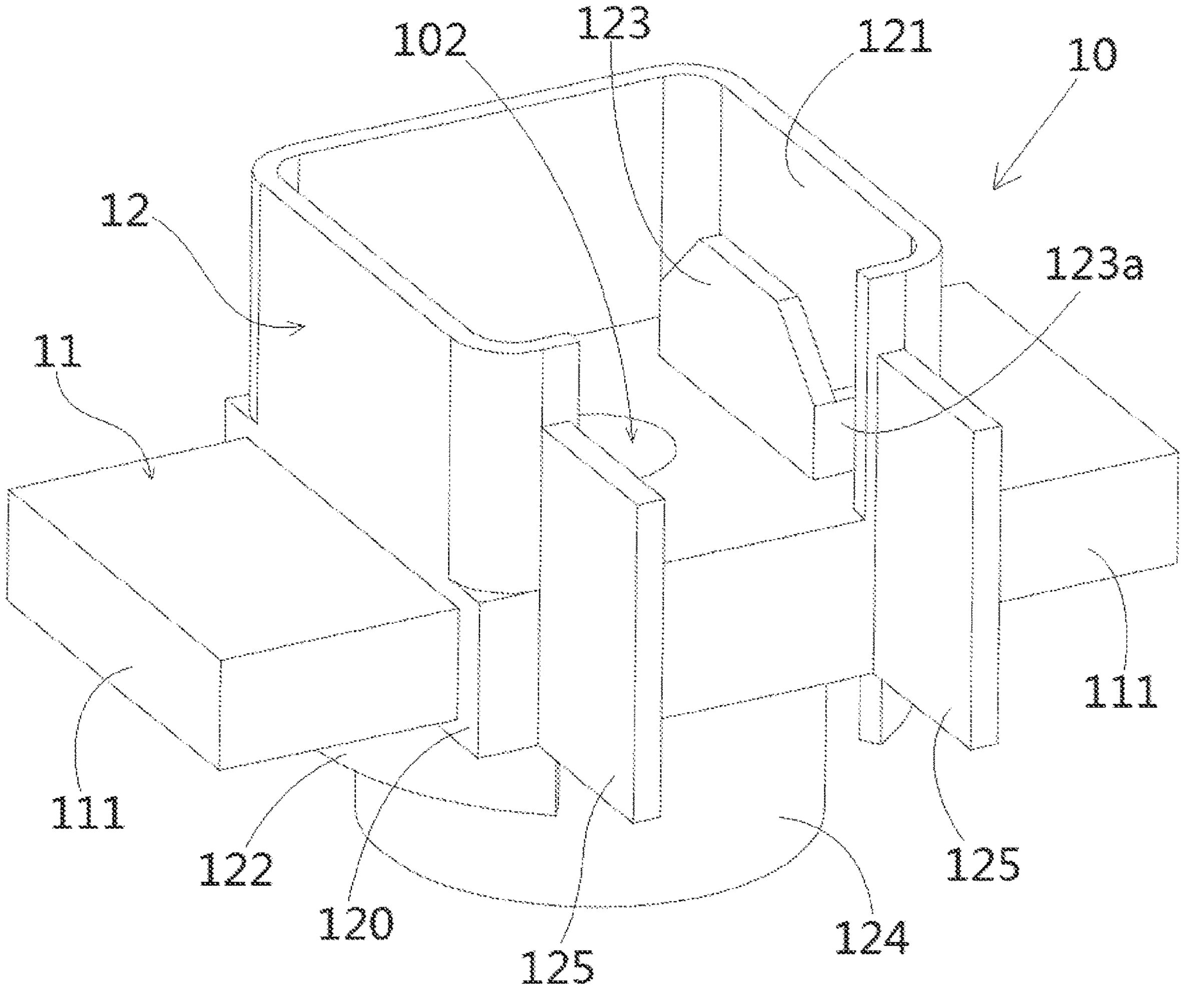
FIG. 1 shows an illustrative perspective view of a contactor movable contact module according to an exemplary embodiment of the present invention when viewed from the front side.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to an embodiment of the present invention, a movable contact module of a contactor includes an insulating member comprising an insulating body and a through hole penetrating through the insulating body, and a movable contact comprising a fixed portion fixed in the insulating body and an exposed portion exposed from the insulating body. The fixed portion of the movable contact is wrapped in the insulating body so that the movable contact is electrically isolated from a drive shaft passing through the through hole. The insulating member further includes a peripheral wall protruding from the insulating body and surrounding an opening of the through hole. The peripheral wall increasing the creepage distance between the drive shaft passing through the through hole and the exposed portion of the movable contact.

According to another embodiment the present invention, there is provided a movable contact assembly for a contactor. The movable contact assembly comprises the above movable contact module, and a drive shaft which passes through a through hole in the insulating member. The drive shaft is elastically connected to the contactor movable contact module for driving the movable contact to move between a closed position in electrical contact with a static contact and an opened position in electrical separation from the static contact.

According to another embodiment of the present invention, there is provided a movable contact device for contactor. The movable contact device comprises the above movable contact assembly, a magnetic core, a magnetic conductive plate located above the magnetic core, a second spring compressed between the magnetic conductive plate and the magnetic core, and a second snap ring. The second snap ring which is snapped on the other end of the drive shaft and rests against the bottom surface of the magnetic core. The drive shaft passes through the magnetic core, the magnetic conductive plate, and the second spring, and a second snap groove for snapping the second snap ring is formed on the other end of the drive shaft.

According to another embodiment the present invention a contactor comprises a housing, the above movable contact device which is installed in the housing, a coil arranged in the housing, and a static contact arranged in the housing. The magnetic core is housed in the coil and movable relative to the housing, and the magnetic conductive plate is fixed to the housing. When the coil is energized, the drive shaft drives the movable contact to a closed position in electrical contact with the static contact under the action of electromagnetic force generated by the coil. When the coil is deenergized, the drive shaft drives the movable contact to an opened position electrically separated from the static contact under the reset force of the second spring.

Figure 2:
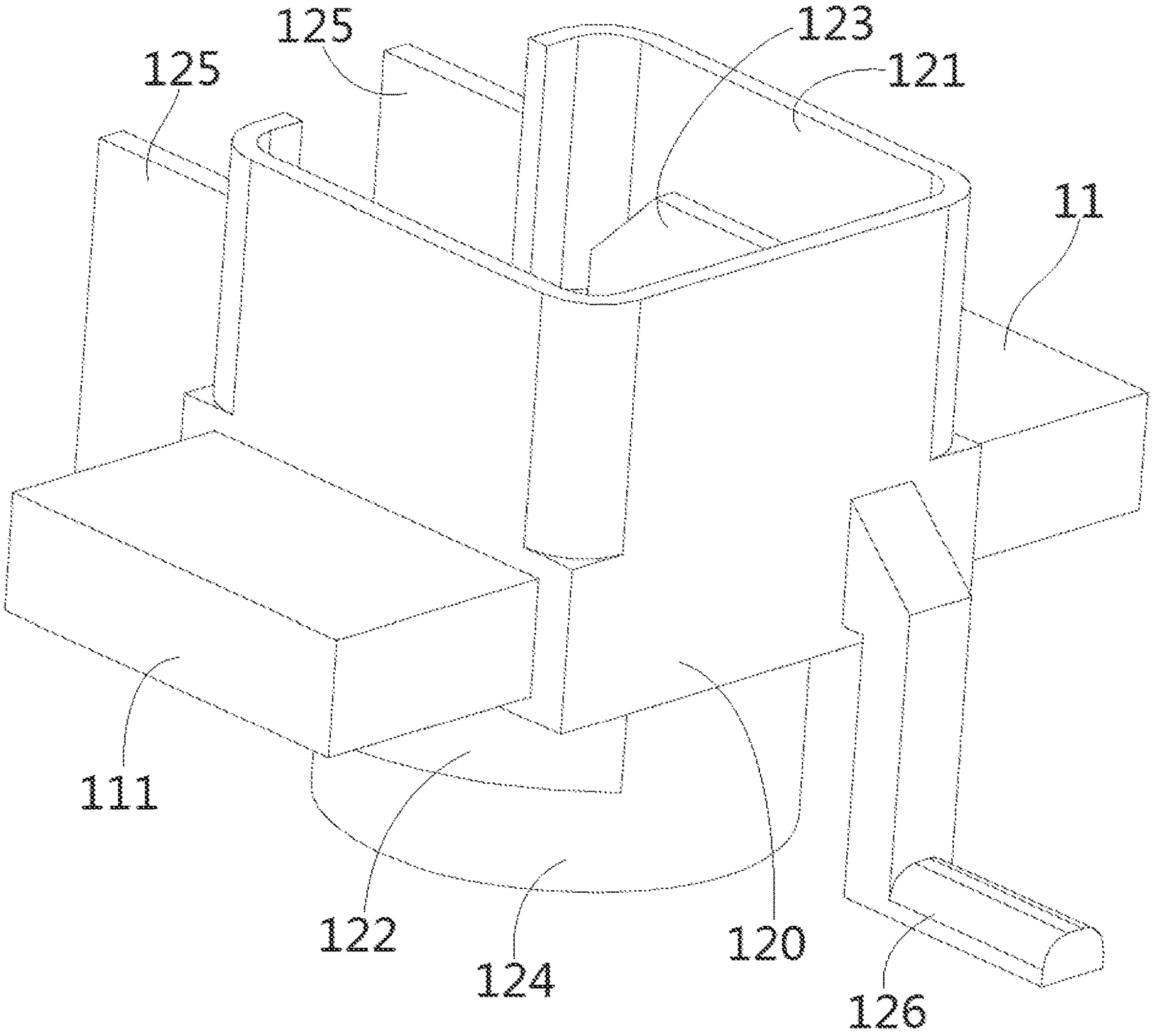
FIG. 2 shows an illustrative perspective view of a contactor movable contact module according to an exemplary embodiment of the present invention when viewed from a rear side.
Figure 3:
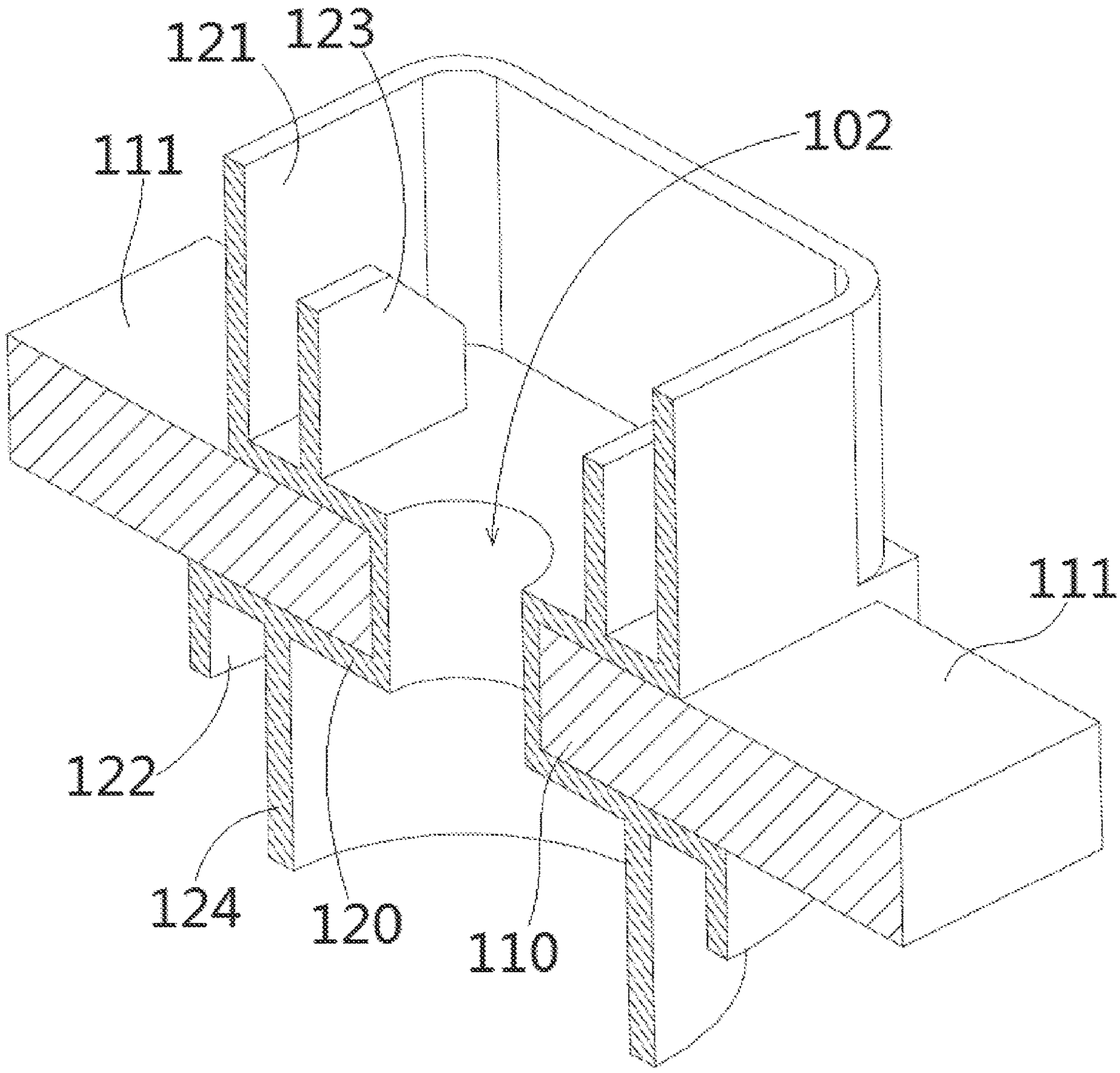
FIG. 3 shows a cross-sectional view of a contactor movable contact module according to an exemplary embodiment of the present invention.

FIG. 1 shows an illustrative perspective view of the contactor movable contact module according to an exemplary embodiment of the present invention when viewed from the front side. FIG. 2 shows an illustrative perspective view of the contactor movable contact module 10 according to an exemplary embodiment of the present invention when viewed from the rear side. FIG. 3 shows a cross-sectional view of the contactor movable contact module 10 according to an exemplary embodiment of the present invention.

As shown in FIGS. 1-3, in the illustrated embodiment, the contactor movable contact module 10 includes a movable contact 11 and an insulating member 12. The insulating member 12 includes an insulating body 120 and a through hole 102 penetrating through the insulating body. The movable contact 11 includes a fixed portion 110 fixed in the insulating body 120 and an exposed portion 111 exposed from the insulating body. The fixed portion 110 of the movable contact 11 is wrapped in or surrounded by the insulating body 120 so that the movable contact is electrically isolated from a drive shaft 13 (see FIGS. 4 and 5) passing through the through hole 102. The insulating member 12 also includes peripheral walls 121, 122, and 124 protruding from the insulating body 120 and surrounding an opening of the through hole 102 to increase the creepage distance between the drive shaft 13 passing through the through hole and the exposed portion 111 of the movable contact 11 (i.e., the shortest distance along a surface of the insulating member 12 between the movable contact 11 and the drive shaft 13).

The insulating body 120 has opposite top and bottom surfaces in its thickness direction. The peripheral walls 121, 122, and 124 include a first peripheral wall 121 and a second peripheral wall 122, 124. The first peripheral wall 121 protrudes from the top surface of the insulating body 120 and surrounds the top opening of the through hole 102. The second peripheral wall 122, 124 protrudes from the bottom surface of the insulating body 120 and surrounds the bottom opening of the through hole 102.

The insulating body 120 has opposite left and right sides in its longitudinal direction. Two end portions 111 of the movable contact 11 are exposed from the left and right sides of the insulating body, respectively. The insulating member 12 further includes a plurality of isolation walls 123 protruding from the top surface of the insulating body 120. The plurality of isolation walls 123 are located on both radial sides of the through hole 102. The isolation walls 123 extend along the width and thickness directions of the insulating body 120 to further increase the creepage distance between the drive shaft 13 passing through the through hole 102 and the exposed end(s) 111 of the movable contact 11. The isolation walls 123 are located in an inner cavity surrounded by the first peripheral wall 121 and are separated from the first peripheral wall in a radial direction of the through hole 102. The insulating member 12 also includes connecting walls 123*a* connected between the isolation walls 123 and the first peripheral wall 121, as shown in FIG. 1.

Still referring to FIGS. 1 to 3, the insulating body 120 has opposite front and rear sides in its width direction, and an opening is formed on the first peripheral wall 121 that opens towards the front side of the insulating body. The insulating member 12 also includes at least one pair of side walls 125 connected to both sides of the opening of the first peripheral wall 121, which extend along the thickness and width directions of the insulating body 120 to further increase the creepage distance between the drive shaft 13 passing through the through hole 102 and the exposed end 111 of the movable contact 11. The side wall 125 extends from the first peripheral wall 121 to the bottom surface of the insulating body 120 and is connected to the front side of the insulating body 120.

The second peripheral walls 122, 124 include a second inner peripheral wall 124 and a second outer peripheral wall 122. The second inner peripheral wall 124 protrudes from the bottom surface of the insulating body 120 and surrounds the bottom opening of the through hole 102. The second outer peripheral wall 122 protrudes from the bottom surface of the insulating body 120 and surrounds the second inner peripheral wall 124. The second outer peripheral wall 122 and the second inner peripheral wall 124 are spaced apart in a radial direction of the through hole 102 and extend along the circumferential and axial directions of the through hole to increase the creepage distance between the drive shaft 13 passing through the through hole 102 and the exposed end 111 of the movable contact 11. An extension height of the second inner peripheral wall 124 in the axial direction of the through hole 102 is greater than the extension height of the second outer peripheral wall 122 in the axial direction of the through hole 102.

The second inner peripheral wall 124 extends continuously along the circumferential direction of the through hole 102. Specifically, the second inner peripheral wall 124 is a continuous peripheral wall without any opening. An opening is formed on the second outer peripheral wall 122 that opens towards the front side of the insulating body 120. However, the present invention is not limited to the illustrated embodiment, and the second outer peripheral wall 122 may also be a continuous peripheral wall without any opening.

In the illustrated embodiment, the insulating member 12 also includes an auxiliary switch pressing portion 126 for triggering an auxiliary switch 60, so that the auxiliary switch pressing portion 126 moves synchronously with the movable contact 11. Further, the insulating member 12 and the movable contact 11 are formed into an integral injection molded piece, in which the movable contact 11 is an insert and the insulating member 12 is an injection molded part, such that the insulating member 12 and the movable contact 11 are directly bonded together.

Figure 4:
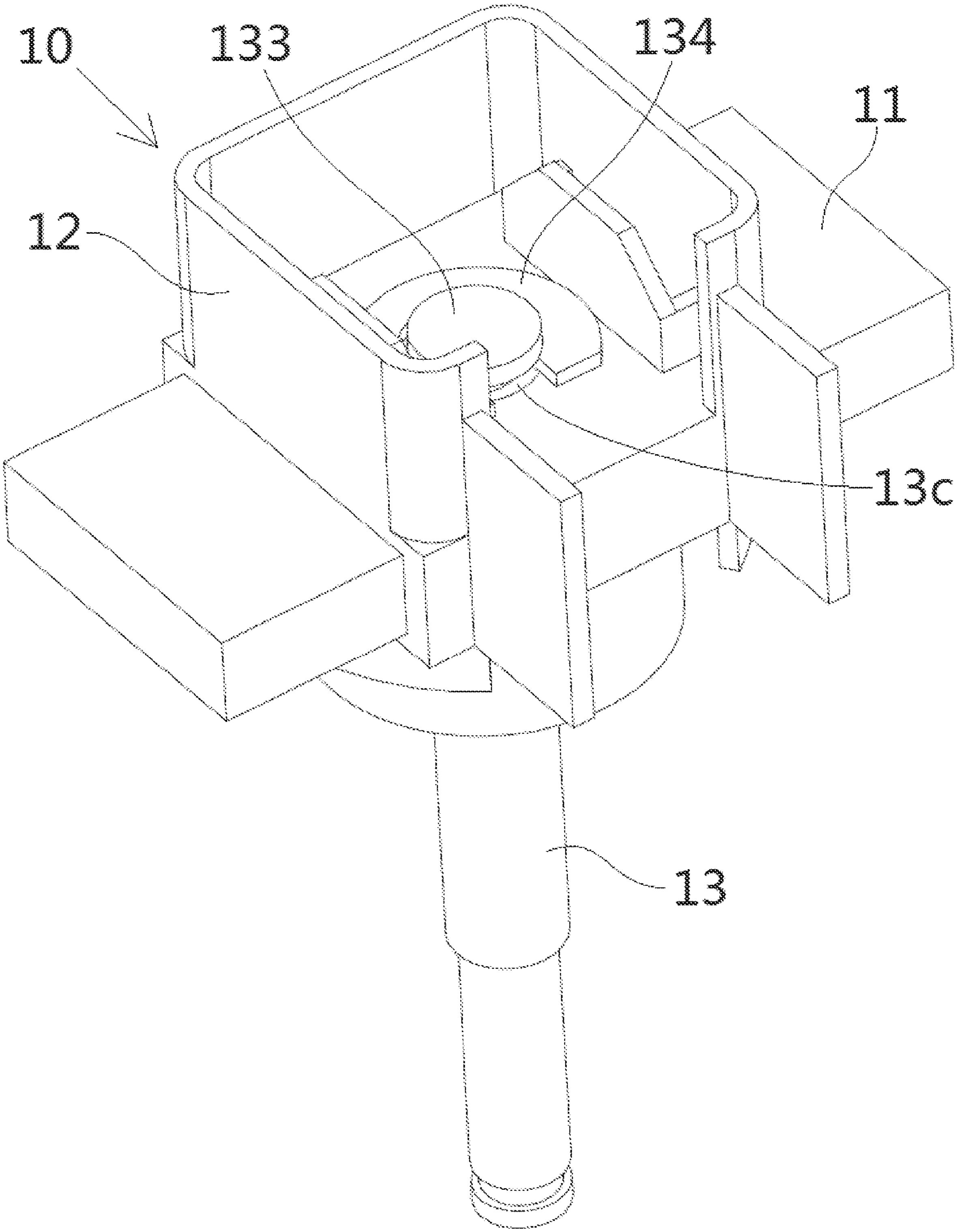
FIG. 4 shows an illustrative perspective view of a contactor movable contact assembly according to an exemplary embodiment of the present invention when viewed from the front side.
Figure 5:
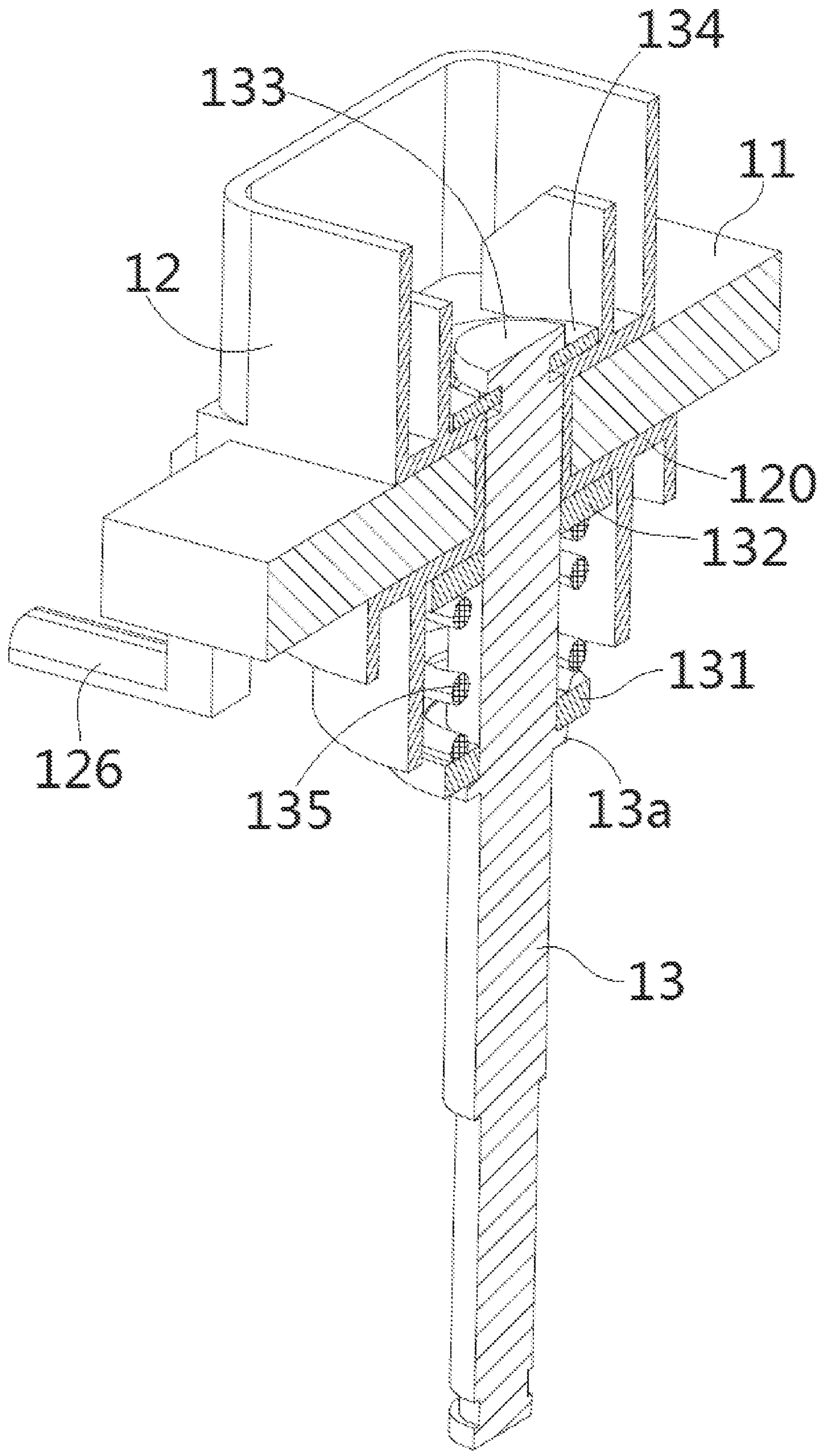
FIG. 5 shows a cross-sectional view of a contactor movable contact assembly according to an exemplary embodiment of the present invention.

FIG. 4 shows an illustrative perspective view of a contactor movable contact assembly according to an exemplary embodiment of the present invention when viewed from the front side. FIG. 5 shows a cross-sectional view of a contactor movable contact assembly according to an exemplary embodiment of the present invention.

As shown in FIGS. 1-5, the contactor movable contact assembly includes the aforementioned contactor movable contact module 10 and the drive shaft 13. The drive shaft 13 passes through the through hole 102 in the insulating member 12. The drive shaft 13 is elastically connected to the contactor movable contact module 10 for driving the movable contact 11 to move between a closed position in electrical contact with a static contact (not shown) and an opened position in electrical separation from the static contact.

In the illustrated embodiment, a radial flange 13*a* and a first snap groove 13*c* are formed on the drive shaft 13. The first snap groove 13*c* is located at one end 133 of the drive shaft 13. The contactor movable contact assembly further includes a first snap ring 134 and a first spring 135. The first snap ring 134 is snapped in the first snap groove 13*c* and rests against the top surface of the insulating body 120. The first spring 135 is compressed between the bottom surface of the insulating body 120 and the radial flange 13*a* of the drive shaft 13.

The contactor movable contact assembly further includes a first washer 131 and a second washer 132. The first washer 131 is supported on the radial flange 13*a* of the drive shaft 13. The second washer 132 is against the bottom surface of the insulating body 120. The two ends of the first spring 135 rest against the first washer 131 and the second washer 132, respectively. The first spring 135 is accommodated in an inner cavity surrounded by the second inner peripheral wall 124 of the insulating member 12 to position the first spring 135 in a circumferential direction. The first spring 135 is used to provide contact pressure to the movable contact 11 to ensure reliable electrical contact between the movable contact 11 and the static contact.

Figure 6:
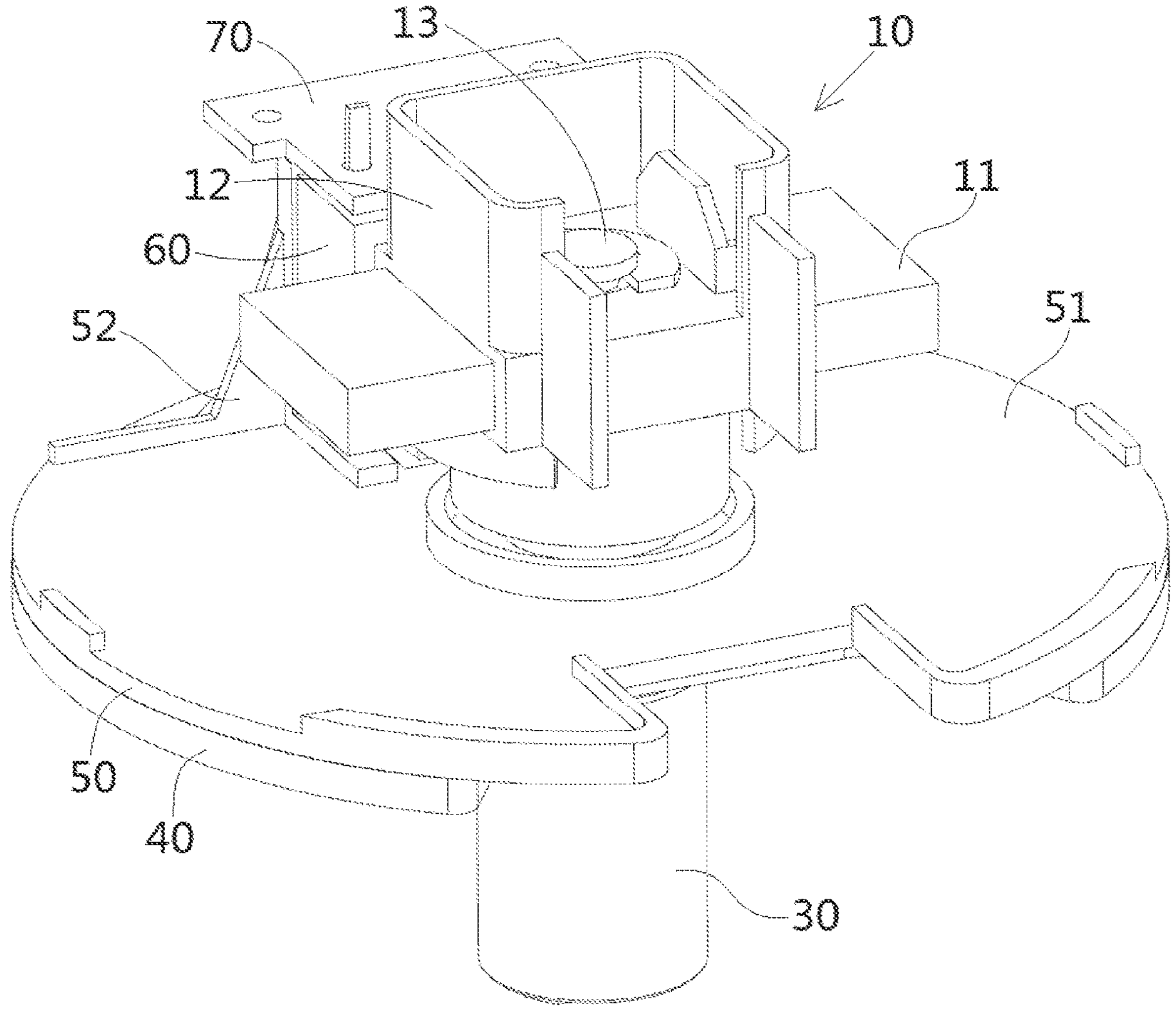
FIG. 6 shows an illustrative perspective view of a contactor movable contact device according to an exemplary embodiment of the present invention when viewed from the front side.
Figure 7:
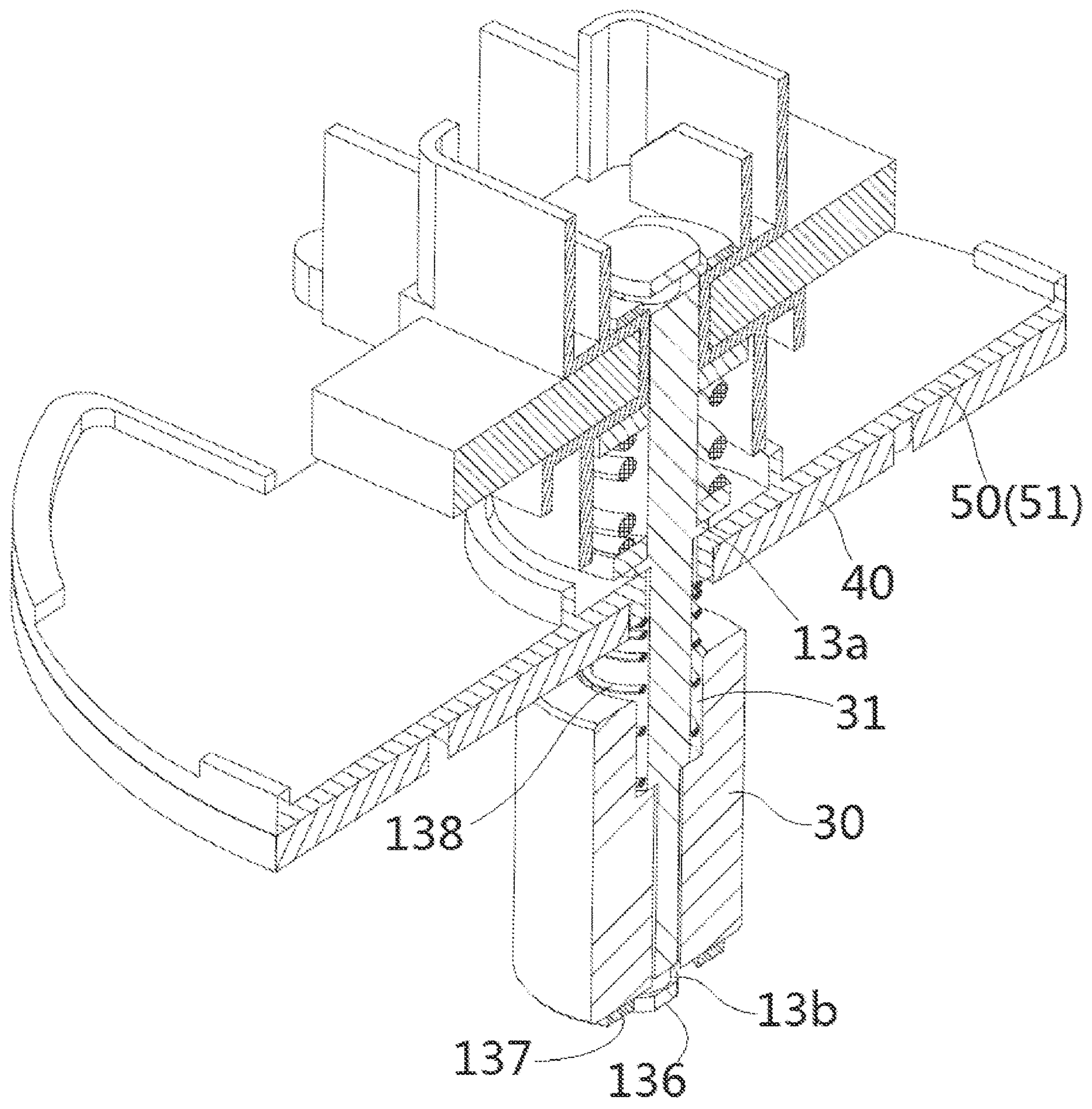
FIG. 7 shows a cross-sectional view of a contactor movable contact device according to an exemplary embodiment of the present invention.
Figure 8:
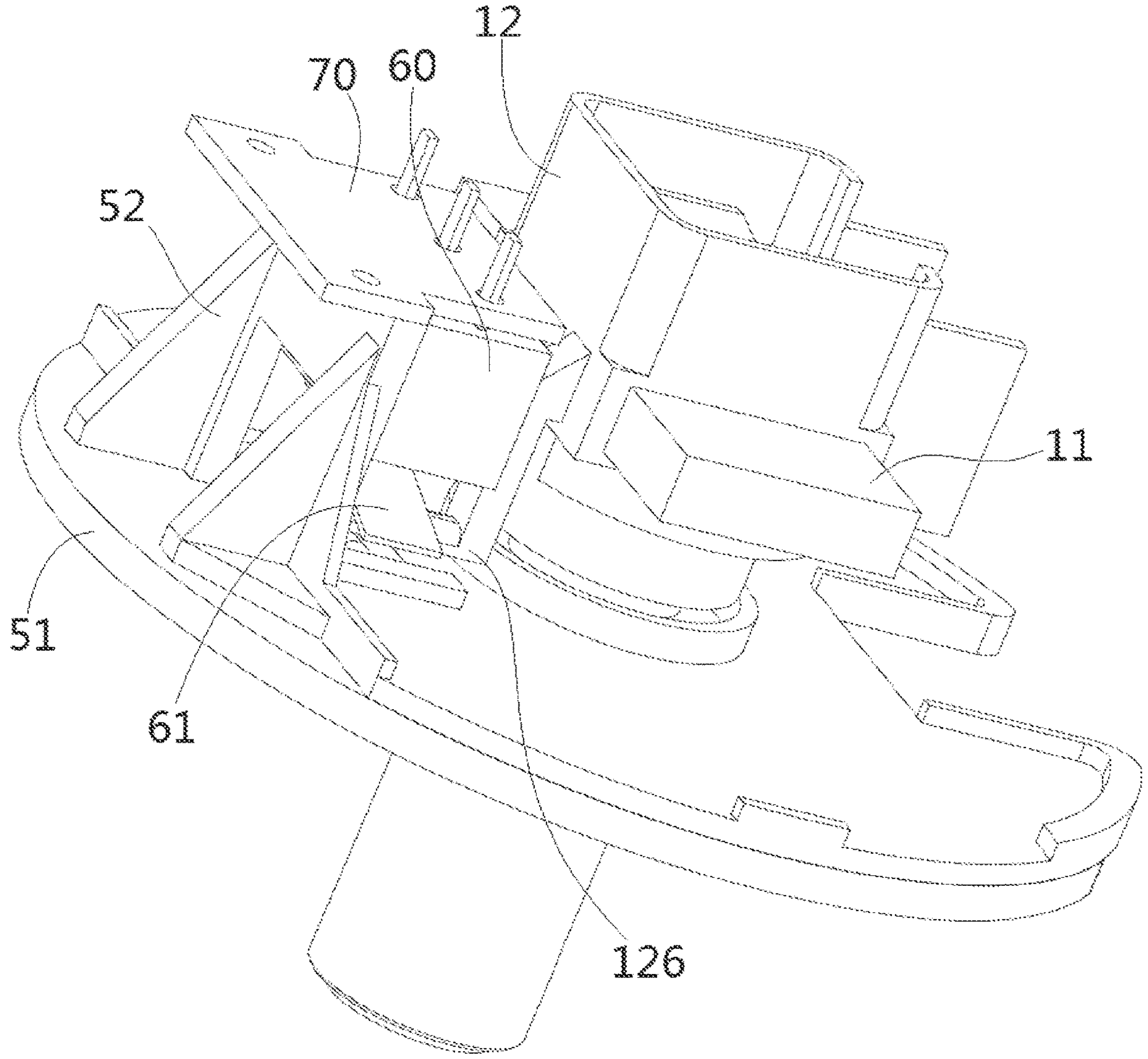
FIG. 8 shows an illustrative perspective view of a contactor movable contact device according to an exemplary embodiment of the present invention when viewed from the rear.

FIG. 6 shows an illustrative perspective view of a contactor movable contact device according to an exemplary embodiment of the present invention when viewed from the front side. FIG. 7 shows a cross-sectional view of a contactor movable contact device according to an exemplary embodiment of the present invention. FIG. 8 shows an illustrative perspective view of a contactor movable contact device according to an exemplary embodiment of the present invention when viewed from the rear.

As shown in FIGS. 1-8, the contactor movable contact device includes the aforementioned contactor movable contact assembly, a magnetic core 30, a magnetic conductive plate 40, a second spring 138, and a second snap ring 137. The magnetic conductive plate 40 is located above the magnetic core 30. The second spring 138 is compressed between the magnetic conductive plate 40 and the magnetic core 30. The second snap ring 137 is snapped on the other end of the drive shaft 13 and rests against the bottom surface of the magnetic core 30. The drive shaft 13 passes through the magnetic core 30, the magnetic conductive plate 40, and the second spring 138. A second snap groove 13*b* for holding the second snap ring 137 is formed on the other end 136 of the drive shaft 13.

The contactor movable contact device further comprises an insulation mounting piece 50 and an auxiliary switch 60. The insulation mounting piece 50 is mounted on the top surface of the magnetic conductive plate 40. The auxiliary switch 60 is mounted on the insulation mounting piece 50. When the movable contact 11 is moved to the closed position in electrical contact with the static contact, the auxiliary switch pressing portion 126 on the insulating member 12 presses a triggering portion 61 of the auxiliary switch 60 to trigger the auxiliary switch 60, causing the auxiliary switch 60 to be switched to a triggering state. When the movable contact 11 is moved to the opened position electrically separated from the static contact, the auxiliary switch pressing portion 126 on the insulating member 12 is separated from the auxiliary switch 60 to release the auxiliary switch 60, and the auxiliary switch 60 is reset to its initial state.

The insulation mounting piece 50 includes a base plate 51 and a bracket 52. The base plate 51 is mounted on the top surface of the magnetic conductive plate 40. The bracket 52 is connected to the base plate 51. The contactor movable contact device further comprises a circuit board 70 fixed to the bracket 52, and the auxiliary switch 60 is mounted on the circuit board 70.

In an exemplary embodiment of the present invention, a contactor is also disclosed. The contactor comprises a housing, the aforementioned contactor movable contact device, a coil, and a static contact. The contactor movable contact device is installed in the housing. The coil and the static contact are fixedly arranged in the housing. The magnetic core 30 is housed in the coil and movable relative to the housing, and the magnetic conductive plate 40 is fixed to the housing. When the coil is energized, the drive shaft 13 drives the movable contact 11 to the closed position in electrical contact with the static contact under the action of electromagnetic force generated by the coil. When the coil is deenergized, the drive shaft 13 drives the movable contact 11 to the opened position electrically separated from the static contact under the reset force of the second spring 138.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A contactor movable contact module, comprising:
- an insulating member including:
  - an insulating body having a through hole penetrating therethrough;
  - an auxiliary switch pressing portion adapted to trigger an auxiliary switch; and
  - a peripheral wall protruding from the insulating body and surrounding an opening of the through hole; and
- a movable contact including:
  - a fixed portion fixed in the insulating body; and
  - an exposed portion exposed from the insulating body, the fixed portion of the movable contact is surrounded by the insulating body so as to be electrically isolated from a drive shaft passing through the through hole, the peripheral wall of the insulating member increasing a creepage distance between the drive shaft passing through the through hole and the exposed portion of the movable contact, the auxiliary switch pressing portion moving synchronously with the movable contact.

2. The contactor movable contact module according to claim 1, wherein:
- the insulating body has a top surface and a bottom surface opposite thereto in the thickness direction; and
- the peripheral wall includes:
  - a first peripheral wall protruding from the top surface of the insulating body and surrounding a top opening of the through hole; and
  - a second peripheral wall protruding from the bottom surface of the insulating body and surrounding a bottom opening of the through hole.

3. The contactor movable contact module according to claim 2, wherein the insulating body has left and right sides opposite one another in its longitudinal direction, and two ends of the movable contact are exposed from the left and right sides of the insulating body, respectively.

4. The contactor movable contact module according to claim 3, wherein the insulating member further comprises a plurality of isolation walls protruding from the top surface of the insulating body, the plurality of isolation walls are located on both radial sides of the through hole, each of the isolation walls extends along the width and thickness directions of the insulating body to further increase the creepage distance between the drive shaft passing through the through hole and the exposed end of the movable contact.

5. The contactor movable contact module according to claim 4, wherein the isolation walls are located in an inner cavity surrounded by the first peripheral wall and are separated from the first peripheral wall in a radial direction of the through hole.

6. The contactor movable contact module according to claim 3, wherein:
- the insulating body has opposite front and rear sides in its width direction, and an opening formed on the first peripheral wall that opens towards the front side of the insulating body; and
- the insulating member further includes at least one pair of side walls connected to both sides of the opening of the first peripheral wall, the side walls extend along the thickness and width directions of the insulating body to further increase the creepage distance between the drive shaft passing through the through hole and the exposed end of the movable contact.

7. The contactor movable contact module according to claim 6, wherein each side wall of the at least one pair of side walls extends from the first peripheral wall to the bottom surface of the insulating body and is connected to the front side of the insulating body.

8. The contactor movable contact module according to claim 3, wherein the second peripheral wall includes:
- a second inner peripheral wall protruding from the bottom surface of the insulating body and surrounding the bottom opening of the through hole; and
- a second outer peripheral wall protruding from the bottom surface of the insulating body and surrounding the second inner peripheral wall, the second outer peripheral wall and the second inner peripheral wall are spaced apart in a radial direction of the through hole and extend along the circumferential and axial directions of the through hole to increase the creepage distance between the drive shaft passing through the through hole and the exposed end of the movable contact.

9. The contactor movable contact module according to claim 8, wherein an extension height of the second inner peripheral wall in the axial direction of the through hole is not equal to an extension height of the second outer peripheral wall in the axial direction of the through hole.

10. The contactor movable contact module according to claim 8, wherein the second inner peripheral wall extends continuously along the circumferential direction of the through hole, and the second outer peripheral wall is formed with an opening that opens towards the front side of the insulating body.

11. The contactor movable contact module according to claim 1, wherein the insulating member and the movable contact are formed as an integral element.

12. A movable contact assembly for a contactor, comprising:

a movable contact module including:

an insulating member having:

an insulating body having a through hole penetrating therethrough; and a peripheral wall protruding from the insulating body and surrounding an opening of the through hole; and a movable contact having:

a fixed portion fixed in the insulating body; and an exposed portion exposed from the insulating body, the fixed portion of the movable contact surrounded by the insulating body;

a drive shaft passing through a through hole in the insulating member, the drive shaft is elastically connected to the contactor movable contact module and driving the movable contact to move between a closed position in electrical contact with a static contact and an opened position in electrical separation from the static contact, the movable contact being electrically isolated from a drive shaft passing through the through hole, and the peripheral wall of the insulating member increasing a creepage distance between the drive shaft passing through the through hole and the exposed portion of the movable contact;

a first snap ring that is snapped in a first snap groove formed on one end of the drive shaft, and resting against the top surface of the insulating body; and a first spring compressed between the bottom surface of the insulating body and a radial flange formed on the drive shaft.

13. The movable contact assembly according to claim 12, further comprising:

a first washer supported on the radial flange of the drive shaft; and a second washer biased against the bottom surface of the insulating body, the two ends of the first spring rest against the first washer and the second washer, respectively.

14. The movable contact assembly according to claim 13, wherein the first spring is received in an inner cavity surrounded by the second inner peripheral wall of the insulating member.

15. The movable contact assembly according to claim 12, further comprising:

a magnetic core;

a magnetic conductive plate located above the magnetic core;

a second spring compressed between the magnetic conductive plate and the magnetic core, the drive shaft passing through the magnetic core, the magnetic conductive plate, and the second spring;

a second snap ring which is snapped on the other end of the drive shaft and rests against the bottom surface of the magnetic core; and a second snap groove for snapping the second snap ring is formed on the other end of the drive shaft.

16. The movable contact assembly according to claim 15, further comprising:

an insulation mounting piece mounted on the top surface of the magnetic conductive plate; and an auxiliary switch mounted on the insulation mounting piece, when the movable contact is moved to a closed position in electrical contact with a static contact, the auxiliary switch pressing portion on the insulating member presses a triggering portion of the auxiliary switch to trigger the auxiliary switch, and when the movable contact is moved to an opened position electrically separated from the static contact, the auxiliary switch pressing portion on the insulating member is separated from the auxiliary switch to release the auxiliary switch and reset the auxiliary switch to an initial state.

17. The movable contact device according to claim 16, wherein:

the insulation mounting piece includes:

a base plate mounted on the top surface of the magnetic conductive plate; and a bracket connected to the base plate; and the movable contact device further comprises a circuit board fixed to the bracket, and the auxiliary switch is installed on the circuit board.

18. A movable contact module, comprising:

an insulating member, including:

an insulating body having a top surface and a bottom surface opposite to the top surface in a thickness direction, and defining a through hole; and a peripheral wall protruding from the insulating body and surrounding at least one open end of the through hole, the peripheral wall including:

a first peripheral wall protruding from the top surface of the insulating body and surrounding a top opening of the through hole; and a second peripheral wall protruding from the bottom surface of the insulating body and surrounding a bottom opening of the through hole; and a movable contact having a first portion arranged within the insulating member, and a second portion exposed and extending from the insulating member, the fixed portion being at least partially surrounded by the insulating member and adapted to be electrically isolated from a drive shaft passing through the through hole.

19. A movable contact module, comprising:

an insulating member, including:

an insulating body having a top surface, and defining a through hole;

a peripheral wall protruding from the insulating body and surrounding at least one open end of the through hole; and isolation walls protruding from the top surface of the insulating body and extending along width and thickness directions of the insulating body, the isolation walls located in an inner cavity surrounded by the peripheral wall and separated from the peripheral wall in a radial direction of the through hole; and a movable contact having a first portion arranged within the insulating member, and a second portion exposed and extending from the insulating member, the fixed portion being at least partially surrounded by the insulating member and adapted to be electrically isolated from a drive shaft passing through the through hole.

20. The movable contact module according to claim 19, wherein:

the insulating body has opposite front and rear sides in its width direction, and an opening formed on the peripheral wall that opens towards the front side of the insulating body; and the insulating member further includes at least one pair of side walls connected to both sides of the opening of the peripheral wall, the side walls extend along the thickness and width directions of the insulating body.

* * * * *